United States Patent
Okimura

[11] Patent Number: 5,892,413
[45] Date of Patent: Apr. 6, 1999

[54] MULTI-TAP DISTRIBUTION APPARATUS

[75] Inventor: Kazuyoshi Okimura, Aichi, Japan

[73] Assignee: Maspro Denkoh, Co., Ltd., Aichi, Japan

[21] Appl. No.: 817,220

[22] PCT Filed: Jul. 24, 1996

[86] PCT No.: PCT/JP96/02108

§ 371 Date: Apr. 10, 1997

§ 102(e) Date: Apr. 10, 1997

[87] PCT Pub. No.: WO97/07571

PCT Pub. Date: Feb. 27, 1997

[30] Foreign Application Priority Data

Aug. 11, 1995 [JP] Japan ................................ 7-206077

[51] Int. Cl.⁶ ........................................................ H04B 3/50
[52] U.S. Cl. ............................ 333/100; 333/136; 361/106
[58] Field of Search ................................. 333/100, 101,
333/103, 124, 125, 127, 136; 338/22 R,
225 D; 361/27, 106

[56] References Cited

U.S. PATENT DOCUMENTS 5,379,022   1/1995   Bacon et al. ........................ 338/22 R
5,645,746   7/1997   Walsh .................................. 361/27 X

FOREIGN PATENT DOCUMENTS 51-160017   of 1976   Japan .
60-25229    2/1985    Japan .
8968135     3/1989    Japan .
580131      10/1993   Japan .

*Primary Examiner*—Paul Gensler
*Attorney, Agent, or Firm*—Pearson & Pearson

[57] ABSTRACT

A distribution apparatus is provided which, if a short circuit occurs in a secondary line from a branch output terminal of the apparatus or in terminal equipment connected to the secondary line, stops supplying electric currents to the concerned branch output terminal. In the distribution apparatus, external taps (22) which serve as distribution output terminals are connected to a current passage network (26). A positive thermistor (27) is connected to each external tap (22) in the current passage network (26).

6 Claims, 5 Drawing Sheets

MULTI-TAP DISTRIBUTION APPARATUS

FIELD OF THE ART

The present invention relates to a multi-tap distribution apparatus. More particularly, the present invention relates to a multi-tap distribution apparatus which is suitable for use with CATV cables.

BACKGROUND ART

Generally, CATV transmission cables are connected to subscribers via multi-tap distribution apparatuses. CATV stations transmit through the cables not only television signals and control signals but also currents for operating main line amplifiers. Therefore, some distribution apparatuses are designed for passing electrical currents therethrough.

Handling instructions and precautions for equipment connected to the transmission cable are not often followed at subscribers' homes. For example, equipment may be inappropriately installed or tampered with by children, which often causes a short circuit. If a short circuit occurs in a secondary line branching out of a terminal of a branch circuit of a distribution apparatus or in terminal equipment connected to the secondary line, it can cause damage not only to the distribution apparatus to which the concerned secondary line is connected but also to the circuits of the equipment installed in the main line.

A fuse or bimetal device is sometimes interposed in the current transmission circuit of a distribution box to block the transmission of a large current. However, replacing a fuse to restore the flow of currents is a time-consuming task as it requires opening the distribution apparatus. On the other hand, the problem with the bimetal device is that, having a high calorific value, this device tends to raise the temperature in the distribution apparatus and hence change the characteristics of the ferrite components inside.

DISCLOSURE OF THE INVENTION

The present invention provides for a distribution apparatus the current transmitting function of which is immediately lost upon occurrence of a short circuit at a terminal of the transmission cable, but is automatically restored when the cause of the short circuit is removed. The distribution apparatus is characterized in that its branch output terminals and the transmission cable can be connected to each other by a current passage network which has positive thermistors interposed therein.

Preferably, one positive thermistor is provided for each of the output branch terminals in the current passage network.

Also, the connection state of said current passage network can be selected by switching operation.

In one aspect of the invention, the positive thermistors may be connected to the current passage network via connectors by being detachably coupled to the connectors. In this way, the connection state of said current passage network can be selected by detaching or attaching the thermistors.

BEST MODE FOR CARRYING OUT THE INVENTION

A multi-tap distribution apparatus embodying the present invention will be explained with reference to the attached drawings. The multi-tap distribution apparatus of the embodiment can be used as either an aerial type or pedestal type device. Also, the number of taps can be changed in the distribution apparatus of this embodiment.

Figure 1:
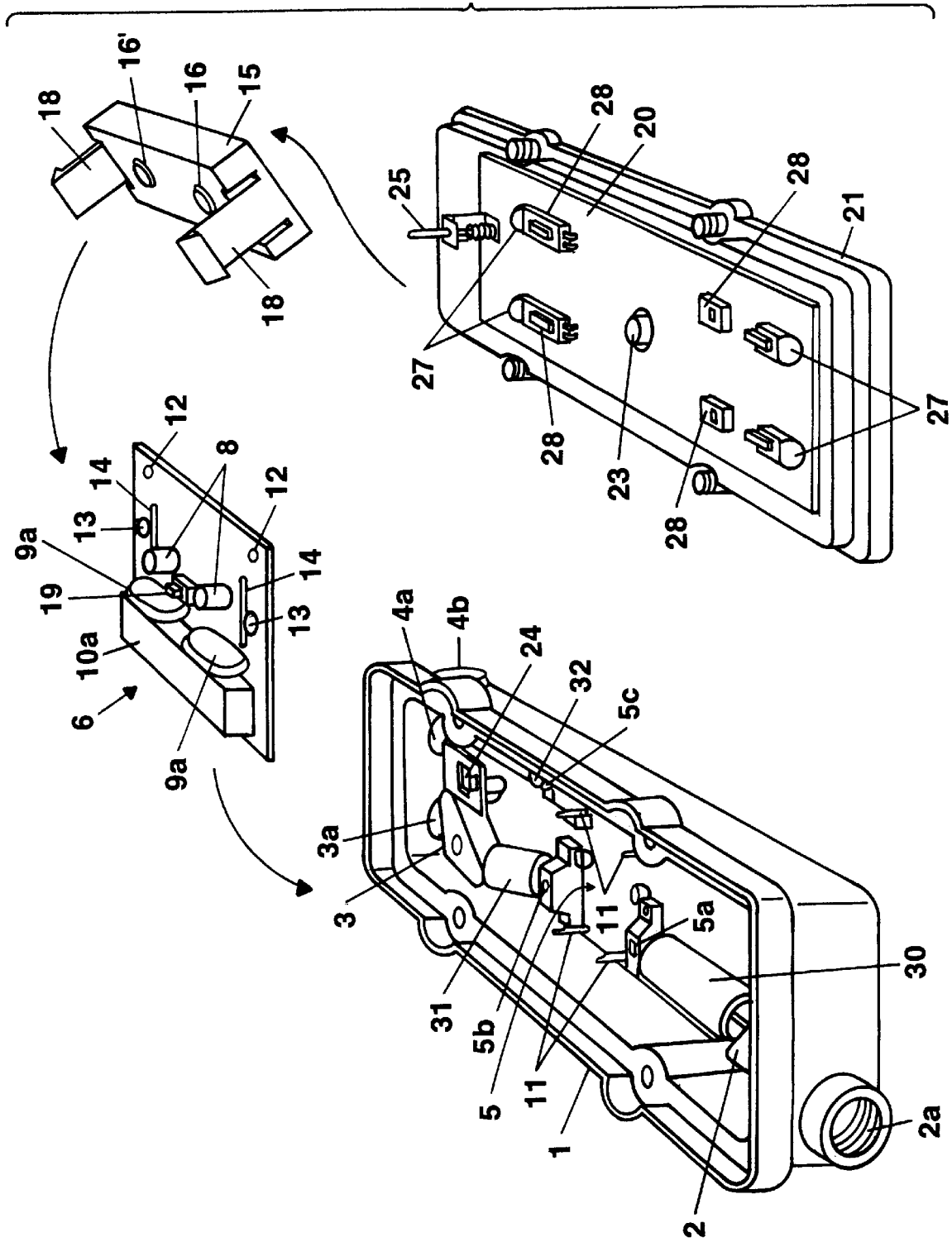
FIG. 1 is an exploded perspective view of a multi-tap distribution apparatus of an embodiment of the present invention.
Figure 2:
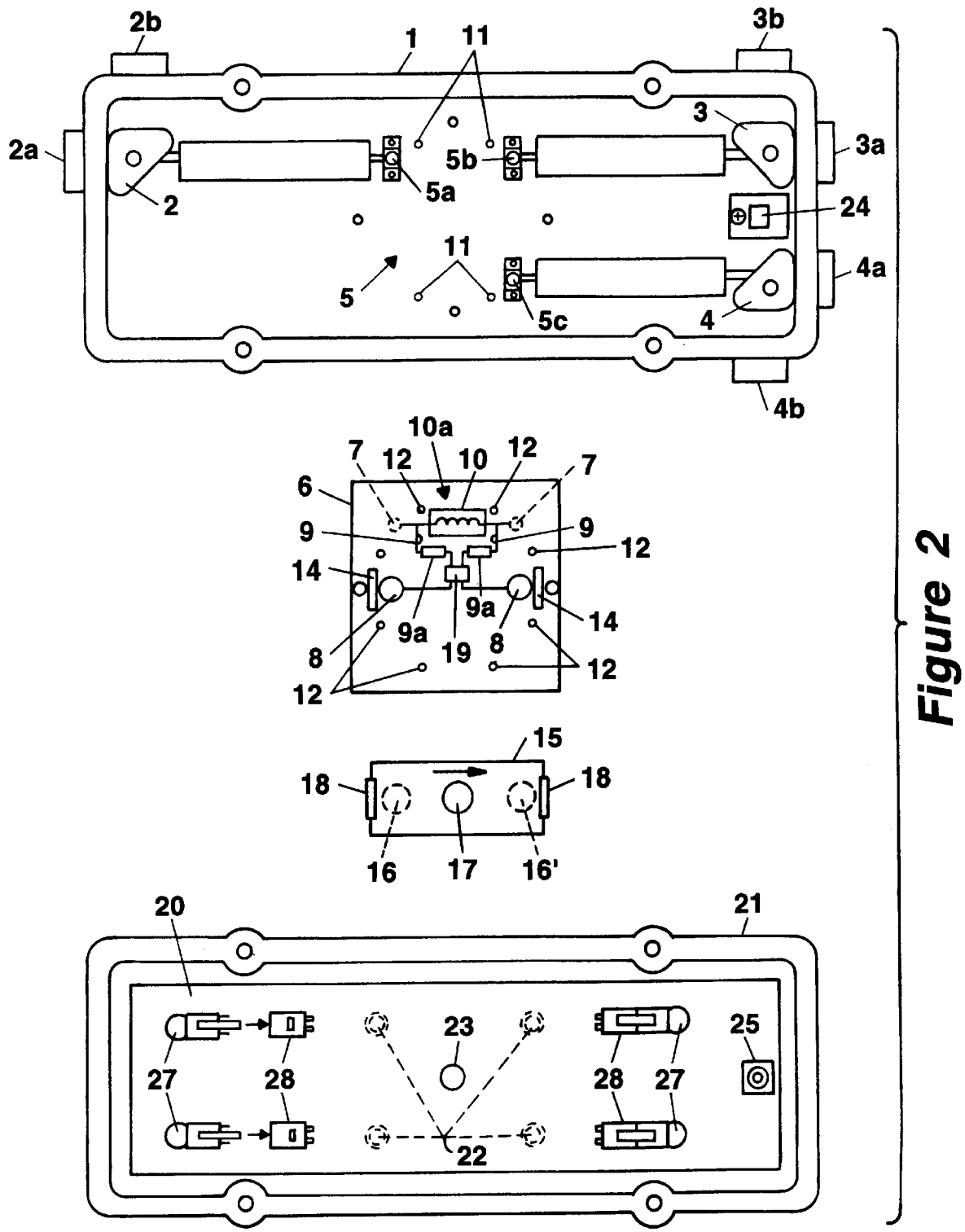
FIG. 2 shows a plan view of the components of the multi-tap distribution apparatus.
Figure 3:
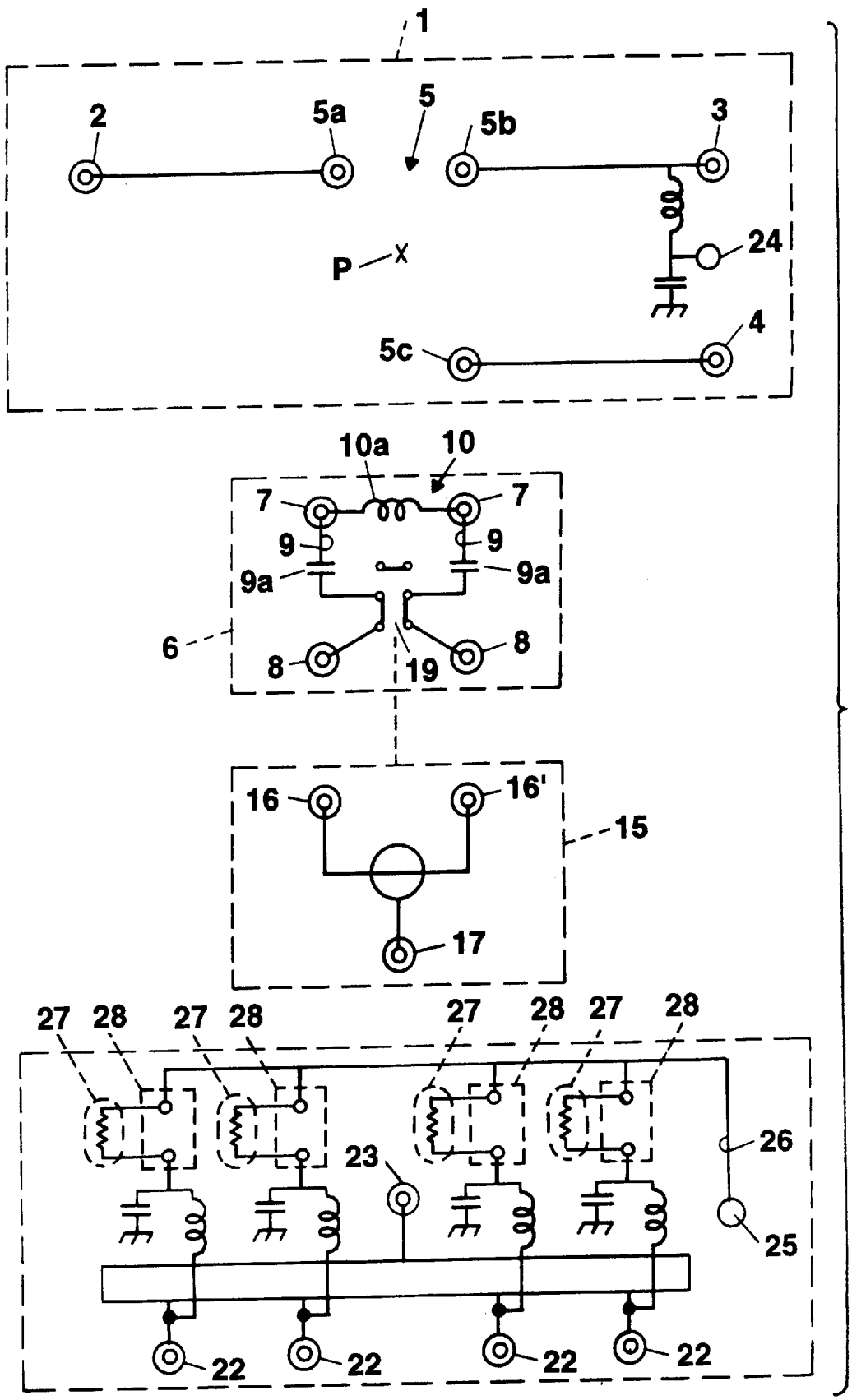
FIG. 3 shows the circuit diagram of the components of the multi-tap distribution apparatus.

Referring to FIGS. 1 to 3, numeral 1 designates a box-shaped housing with one side open. The housing 1 is provided with one cable connecting portion 2 on one end surface and two other cable connecting portions 3 and 4 on the opposite end surface. Each of the cable connecting portions 2, 3, and 4 is disposed on a corner of the housing 1. Connector insertion holes 2a, 3a, and 4a are provided in the end surfaces. Provided in the longitudinal sides of the housing 1 are three screw access holes 2b, 3b, and 4b for connecting the central conductors of the connectors to the cable connecting portions 2, 3, and 4.

The housing 1 has in its center a mounting area 5 on which three main line connection terminals 5a, 5b, and 5c are provided. The upper terminals 5a and 5b are located above, and on the right and left sides of, the center P of the housing 1 while the terminal 5c is located directly under the right terminal 5b. The terminals 5a, 5b, and 5c are connected to the respective cable connecting portions 2, 3, and 4, respectively, via transmission lines 30, 31, 32. Each transmission line 30, 31, 32 is composed of a central conductor inserted through a metal cylinder called a coaxial tube.

Being constructed in this manner, the transmission line 30, 31, 32 has a layer of air between the central conductor and the outer conductor. This structure reduces the diameter of the coaxial tube so as to cause only a small transmission loss. It is also confirmed that to obtain the same effect, grooves with a semi-circular cross section may be formed in the inner surface of the housing instead of using the coaxial tubes.

Reference numeral 6 is a mother board having a pair of transmission terminals 7 on its rear face and a pair of relay terminals 8 on its front face. The transmission terminals 7 are spaced apart so as to correspond with the main line connection terminals 5a and 5b (or 5b and 5c). Each of the transmission terminals 7 is connected to a relay terminal 8 via a high-frequency passing circuit 9 with a capacitor 9a interposed therein. The circuits 9 allow high-frequency signals to pass therethrough. The two transmission terminals 7 are connected to each other by a current transmission circuit 10 with a coil 10a interposed therein.

Also, the housing 1 has a plurality of guide pins 11 projected therefrom while the mother board 6 has a plurality of guide holes 12 formed therein corresponding to the guide pins 11. The mother board 6 is mounted in the housing 1 by inserting the guide pins 11 into the guide holes 12. In this way, the transmission terminals 7 are easily aligned and brought into contact with, for example, the main line connection terminals 5a and 5b, although these terminal are not visible behind the mother board 6 during mounting. Then, the mother board 6 is secured to the housing 1 with a pair of screws 13.

Also, the mother board 6 has a pair of engaging slits 14 formed therein outside the relay terminals 8.

Reference numeral 15 designates a box-shaped branch unit which has on one surface a pair of connection terminals 16 and 16' which correspond to the relay terminals 8 of the mother board 6. The branch unit 15 has on the opposite surface a branch terminal 17. The connection terminals 16 and 16' and the branch terminal 17 are connected to a built-in branch circuit. With the connection terminal 16 serving as the input terminal and the connection terminal 16' serving as the output terminal, the branch unit 15 can convey high-frequency signals in a predetermined direction. It also has on both ends thereof two engaging claws 18 projected toward the surface where the connection terminals 16 and 16' are located. When the branch unit 15 is mounted on the mother board 6 by engaging the claws 18 with the slits 14, the connection terminals 16 and 16' are brought into contact with the relay terminals 8.

The branch unit 15 may be mounted on the mother board 6 by other methods. For example, the engaging claws formed on the branch unit may be replaced with guide lugs which are inserted into the slits formed in the mother board. Furthermore, screws or clips may be employed as the means of mounting the branch unit on the mother board.

The mother board 6 is provided with a push switch 19. When the branch unit 15 is mounted on the mother board 6, the outer surface of the branch unit 15 presses against and turns off the switch 19. When the branch unit 15 is detached from the board mother 6, the push switch 19 is released from the pressure of the unit 15 and turned on, thus short-circuiting the relay terminals 8 and allowing passage of high-frequency signals between the transmission terminals 7.

Moreover, the current transmission circuit 10 of the mother board 6 ensures that currents and high-frequency signals flow between the transmission terminals 7 whether or not the branch unit 15 is mounted on the mother board 6.

Reference numeral 20 is a tap board mounted on the inner surface of a main body 21. The tap board 20 includes a distributing circuit and four external taps 22 exposed on the outer surface of the main body 21. The external taps 22 serve as distribution output terminals. The tap board 20 also has on its inner surface an input terminal 23 corresponding to the branch terminal 17 of the branch unit 15. Additionally, the housing 1 is provided with a current passage contact 24 which is connected to the cable connecting portion 3 while the main body 21 is provided with another current passage contact 25 which is connected to the distributing circuit of the main body. Therefore, currents can be transmitted through these two contacts. The current passage contact 24 is connected to the external taps 22 via a current passage network 26 provided on the tap board 20. By fitting the main body 21 on the housing 1, the branch terminal 17 is brought into contact with the input terminal 23. At the same time, an electrical contact is also established between the current passage contacts 24 and 25.

The current passage contact 25 is of a pin type biased toward the tip thereof by a coil spring. The current passage contact 25, if shifted off the insertion-type current passage contact 24, moves back while compressing the coil spring, thus preventing breakage thereof. However, when the housing 1 is moved with respect to the main body 21 to align the two contacts, the contact 25 projects forward to establish an electrical contact.

A positive thermistor 27 (model name: Polyswitch RXE0675; manufactured by Reikem) is interposed between the contact 25 and each distribution output terminal via a connector 28 in the current passage network 26. The positive thermistors 27 can be easily coupled to and detached with a single motion from the connectors 28 (model name: VH series connector; manufactured by Nippon Solderless Terminal Corporation).

Figure 4A:
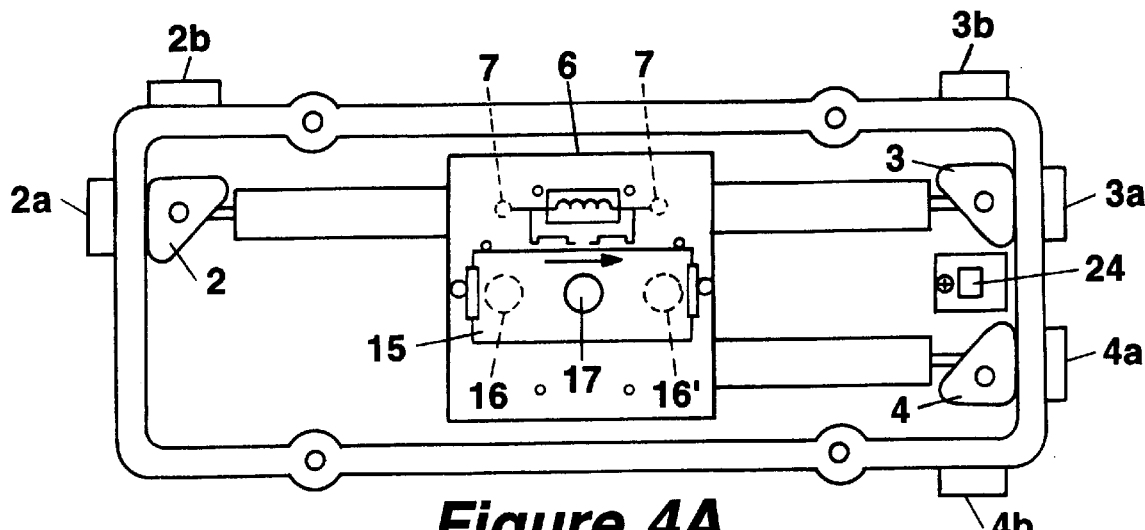
FIGS. 4A, 4B and 4C show different pairs of cable connecting portions to serve as the input and output terminals for the transmission cables.

As shown in FIG. 4A, the multi-tap distribution apparatus can be used as an aerial type device when the branch unit 15 is mounted on the mother board 6 with the terminal 16 on the same side as the cable connecting portion 2 and the terminal 16' on the same side as the cable connecting portion 3. In this case, the cable connecting portion 2 is used as the input terminal while the cable connecting portion 3 is used as the output terminal.

Figure 4B:
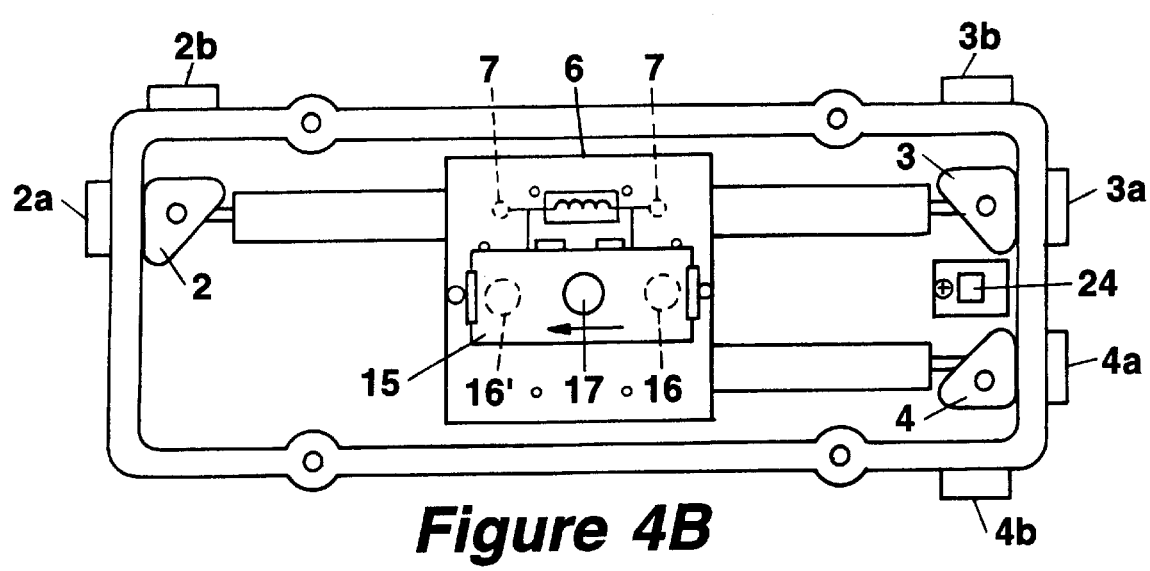

The positions of the input and output terminals can be easily reversed by detaching and horizontally rotating the branch unit 180 degrees and mounting it back on the mother board 6 (see FIG. 4B).

Figure 4C:
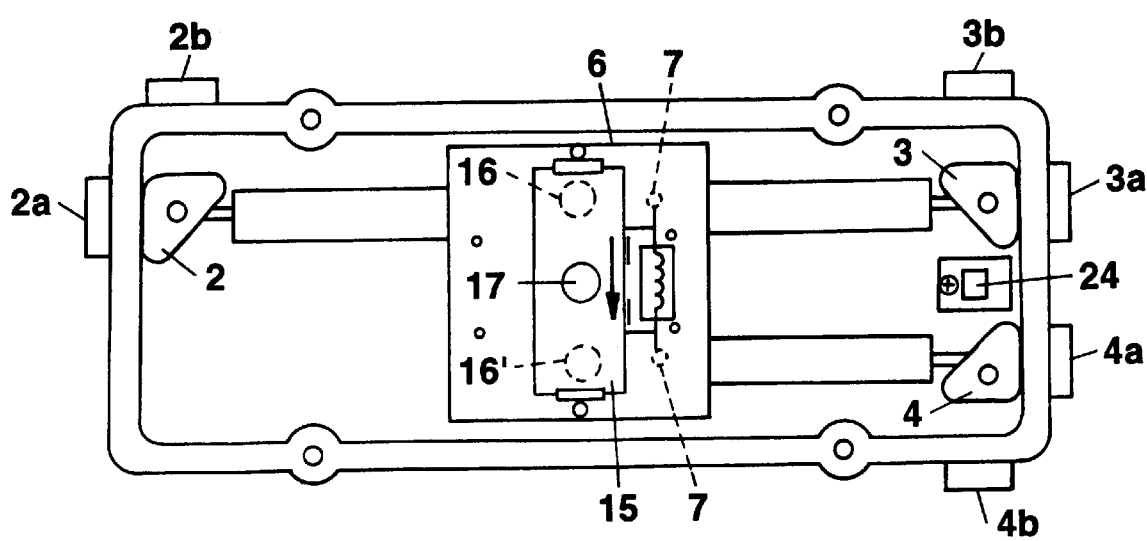

To use the multi-tap distribution apparatus as a pedestal type device, the mother board 6 is detached and rotated 90 degrees in clockwise direction as shown in FIG. 4C, so that the connection terminals 16 and 16' are connected with the main line connection terminals 5b and 5c via the transmission terminals 7. In this application, the cable connecting portion 3 serves as the input terminal and the cable connecting portion 4 as the output terminal. The positions of the input and output terminals can be easily reversed as in the aerial type application: by detaching and rotating the branch unit 15 one hundred and eighty degrees and mounting it back on the mother board 6 (this position is not shown).

To change the number of branches (secondary cables), the main body 21, the tap board 20, and the branch unit 15 are replaced with a different main body incorporating a tap board having a desired number of taps and a different branch unit.

To perform such a replacement, the branch unit 15 can be easily detached by disengaging the claws 18 from the slits 14. Upon detachment of the branch unit 15, the switch 19 is turned on, thus short-circuiting the transmission terminals 7 and maintaining high-frequency signal transmission between the cable connecting portions. Accordingly, the high-frequency signal transmission remains uninterrupted while the branch unit 15 is replaced.

In this embodiment, different cable connecting portions can be selected for use as the input and output terminals by rotating the mother board 90 degrees. Also, the number of taps can be increased or decreased by replacing the branch unit and the main body. Not only does this construction improve the operability of the multi-tap distribution apparatus, but it also allows the multi-tap distribution apparatus to be used as an aerial or pedestal type. Moreover, the multi-tap distribution apparatus offers the advantage of maintaining the check function from a remote site even when the branch unit or the main body is removed since the transmission of the currents and the high-frequency signals from the input side to the output side remains uninterrupted.

If the transmission cable is used as a telephone line, telephone conversations are not interrupted by using the current transmission circuit and the telephone line as the telephone uses signals in the low-frequency range.

If a short circuit occurs on the distribution output terminal side, the resistance of the positive thermistor included in the current passage network increases from tenths of an ohm to several kilo ohms, thus blocking the current flow between the cable connecting portion and the distribution output terminal. This protects the circuits in the distribution apparatus while preventing damage to equipment and devices connected to the transmission cable. This structure can be safely used in applications where currents of 15 amperes or more are conveyed.

As explained above, the high-frequency transmission circuit (branch circuit) is installed separately from the current passage network and a positive thermistor is connected to each distribution output terminal. Therefore, if a short circuit occurs, the current flow is interrupted only to the concerned branch output terminal while maintaining transmission of the television signals.

Since a positive thermistor is detachably connected to each external tap, it is possible to leave installed the positive thermistors for the external taps connected to the subscribers using telephone lines for receiving CATV services. Meanwhile, the power supply can be easily stopped to non-subscribers by removing from the connectors the positive thermistors for the external taps which are connected to non-subscribers. Not only can this operation be simply done but also it is easy to recognize to which externals taps currents are carried.

Figure 5:
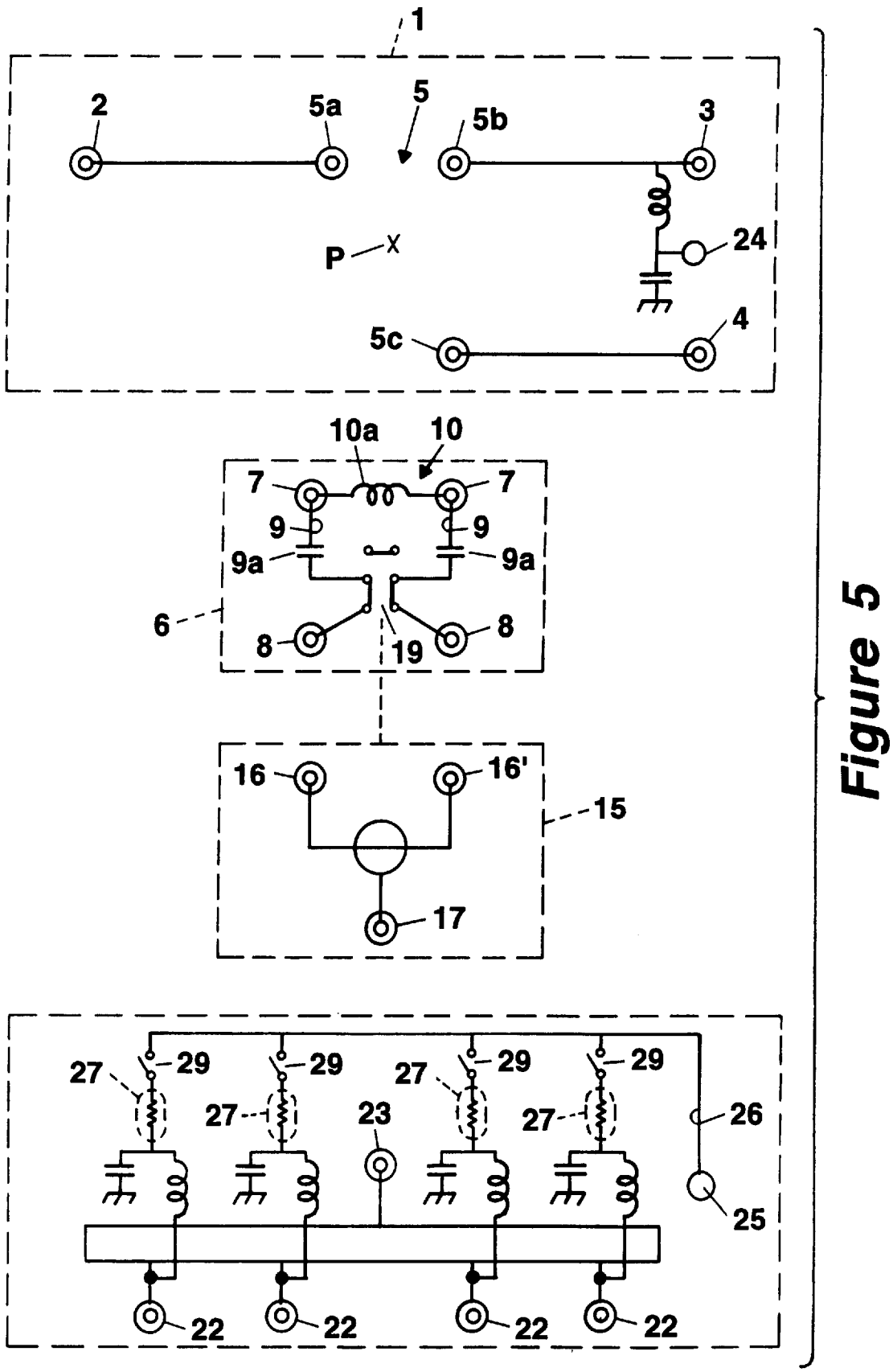
FIG. 5 shows the circuit diagram of a modified distribution apparatus.

Alternatively, as shown in FIG. 5, the same result can be obtained by providing switches 29 in the current passage network 26 and selectively turning on and off the switches 29 instead of detaching positive thermistors as explained above.

Instead of inserting coaxial cables through the cable insertion holes and connecting the cable conductors to the cable connecting portions with screws, connectors may be used to couple the cables.

Each cable connecting portion may be provided with only one cable insertion hole or connector. Furthermore, the number of taps may be either increased or decreased; the main body may have any number of taps.

As described above, the embodiment includes three main line connection terminals on the inner surface of the housing. Two of the terminals are located above and on both sides of the center of the housing while the third terminal is located directly under one of the upper terminals. Accordingly, the pair of main line connection terminals of the mother board to be connected with the transmission terminals can be selected by rotating the mother board. Instead of this construction, equally spaced pairs of main line connection terminals may be arranged on the housing so that the transmission terminals are connected to any desired pair of main line connection terminals by shifting the mother board. However, the present invention is applicable to the types of models in which main line connection terminals cannot be selected for connection or the number of external taps cannot be changed.

If only protection of the components and equipment from short circuits is desired, only one positive thermistor needs to be interposed in the current passage network near the main line connection terminal.

EFFECT OF THE INVENTION

According to the invention, the cable connecting portions and the distributing circuit of the main body are interconnected by a current passage network via positive thermistors. Thus, if there is a short circuit on the external tap side, the resistance of the positive thermistors increases, thus blocking the current flow between the cable connecting portion and the distribution output terminal. This protects the circuits in the distribution apparatus while preventing damage to equipment and devices connected to the main line. This feature is particularly useful when large currents are carried.

Moreover, the current passage network is easily connected with minimum effort by mounting on the main body the housing which incorporates necessary modules. This structure makes the assembly an easy task. Further, since one thermistor is provided for each external tap, an accident in one of the secondary lines does not affect the others. As the thermistors are detachably provided, some of the external taps can be connected to house holds to which currents are to be supplied while other taps can be connected to those to which currents are not to be supplied. Furthermore, the number of external taps can be changed in accordance with the present invention.

We claim:

1. A distribution apparatus for being interposed in a CATV transmission cable, said distribution apparatus comprising, a branch circuit means coupled to said transmission cable for distributing as output signals high-frequency signals received from said transmission cable, a current passage network means coupled to said branch circuit means for connecting a plurality of output branch terminals of said branch circuit means to said transmission cable, and said current passage network means comprises positive thermistors coupled to said plurality of output branch terminals of said branch circuit means.

2. The distribution apparatus in accordance with claim 1 wherein one of said positive thermistors is provided for each of said plurality of output branch terminals in said current passage network means.

3. The distribution apparatus in accordance with claim 1 wherein the connection state of said current passage network means can be selected by switching operation.

4. The distribution apparatus in accordance with claim 1 wherein said positive thermistors are connected to said current passage network means via connectors by being detachably coupled to said connectors.

5. The distribution apparatus in accordance with claim 2 wherein the connection state of said current passage network means can be selected by switching operation.

6. The distribution apparatus in accordance with claim 2 wherein said positive thermistors are connected to said current passage network means via connectors by being detachably coupled to said connectors.

* * * * *